June 10, 1952 P. G. STANSLY ET AL 2,599,950
METHOD OF PREPARING POLYMYXIN
Filed April 30, 1947
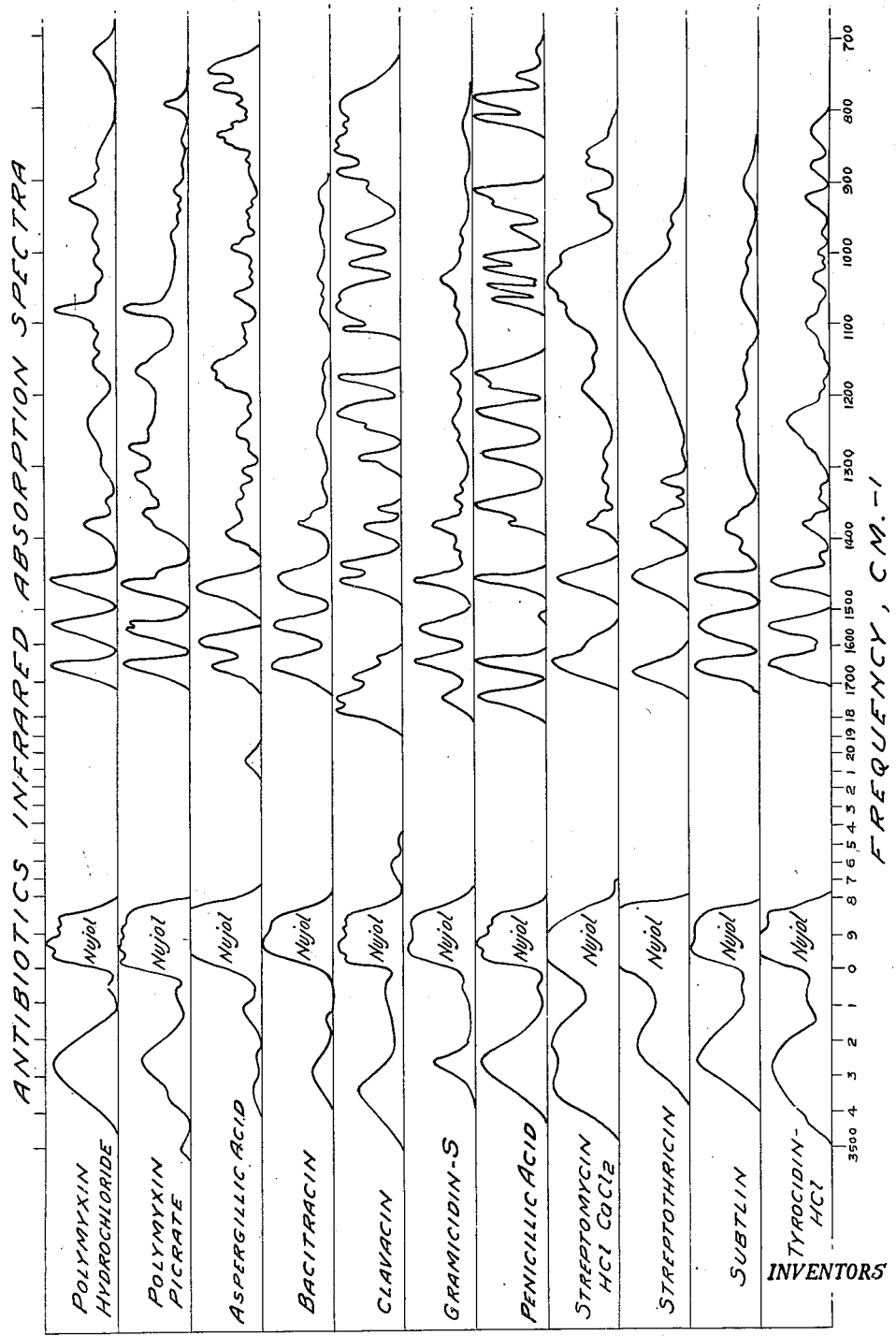
INVENTORS
PHILIP G. STANSLY,
ROBERT G. SHEPHERD,
ROBERT WINTERBOTTOM,
BY Ernest J. Miller AGENT Patented June 10, 1952

2,599,950

UNITED STATES PATENT OFFICE 2,599,950

METHOD OF PREPARING POLYMYXIN

Philip G. Stansly, Robert G. Shepherd, and Robert Winterbottom, Stamford, Conn., assignors to American Cyanamid Company, New York, N. Y., a corporation of Maine Application April 30, 1947, Serial No. 744,940

1 Claim. (Cl. 195—96)

The present invention relates to a new antibacterial substance obtained as a metabolic product of the growth of Bacillus polymyxa, its preparation in purified form, salts and derivatives thereof.

A number of antibiotic substances have been prepared and described within the past few years. Among these might be mentioned penicillin, streptomycin, bacitracin, subtilin, streptothricin, gramicidin and the like. In general, none of the previously known antibacterial agents of this type are permanently effective against Gram-negative bacteria. Streptomycin gives certain favorable initial results, but frequently fails to be effective because of the development of resistant strains.

We have found that a substance which we call polymyxin, obtained from the metabolic liquors of Bacillus polymyxa after cultivation under conditions hereinafter described, is highly active against infections caused by Gram-negative bacteria. Bacillus polymyxa is a micro-organism which occurs inter alia in soils. A culture of the micro-organism shows as a rule Gram-negative vegetative cells, sporulating forms with sporangia attached and free oval spores. The micro-organism in a suitable growth medium ferments carbohydrates such as dextrose, lactose and sucrose with the formation of acid and gas and produces acetyl methyl carbinol, but does not form an amylase enzyme capable of catalyzing the formation of crystalline dextrins from starch.

The polymyxin obtained by the process of the present invention may be a mixture of closely related substances. When examined by a method for establishing homogeneity, described in J. Biol. Chem. 155 519 (1944), using 30% salt solution at pH 3 and butanol as solvents, a curve was obtained which could be reproduced. The substance derived by different methods of isolation produced almost identical curves which indicates the material, although derived by different methods, had the same distribution characteristics. Polymyxin is a material having a high molecular weight being polypeptide-like in nature. In aqueous solution it has a pH within the range pH 9 to pH 11. It also has present at least one primary amino group and at least one hydroxyl radical. It is optically active being laevo-rotatory.

The purified material in aqueous solution may be heated to 100° C. between pH 3 and pH 7.5 for several hours without appreciable loss of activity. In strong acid or alkali the material is completely inactivated in 48 hours at room temperature.

In accordance with the present invention the antibacterial substance polymyxin is prepared by the cultivation of Bacillus polymyxa in a neutral medium for from about 2 to about 5 days at a temperature within the range of about 20° C. to about 30° C. A medium well suited to produce high yields of polymyxin has been found to contain a carbohydrate such as glucose, starch, sucrose, lactose, maltose, and the like, a source of nitrogen such as ammonium sulfate, ammonium chloride, ammonium nitrate, and the like, a proteinaceous material having present vitamins such as yeast extract or soy bean oil meal, corn steep liquor, fish solubles, brewer's yeast or liver extract, and small quantities of inorganic salts such as potassium dihydrogen phosphate, magnesium sulfate, ferrous sulfate and sodium chloride. An excellent medium is one which contained the following quantities of ingredients: Carbohydrate 0.5% to 2%; a nitrogen containing compound 1% to 3%; proteinaceous material 0.3% to 1%; potassium dihydrogen phosphate 0.1% to 0.5%; magnesium sulfate 0.0001% to 0.005% and a trace of sodium chloride.

The Bacillus polymyxa may be cultivated in a suitable medium in shallow layers. It is usually more desirable to use deep fermentation whereupon good yields are obtainable only by passage of gases through the fermentation mixture. The rate of gas flow is not too critical and may vary within wide limits (e. g. 4 to 64 liters per hour per 8 liters medium). Gases such as air or commercial nitrogen (99.7% pure) give equally good results. It is believed that the better results obtained by aeration or nitrogenation may be attributable to the removal of metabolic gases such as carbon dioxide. It was found in one experiment that aeration at the rate of approximately 64 liters per hour for 15 liters of inoculated medium produced good results. Anti-foaming agents such as 1% octadecanol in mineral oil, lard oil and the like, are useful in controlling the foaming usually present under these conditions.

During the course of fermentation an index of the reaction taking place is afforded by the changes in pH of the medium. At the start of fermentation the pH preferably is about 7. After three days the pH drops to about 6 and on the fourth day rises to about 6.5 where it remains indefinitely. At this point the fermentation liquor has a characteristic yeast-like odor. Should the fermentation be unsuccessful in the production of polymyxin, due to contamination or other reasons, the pH of the medium on the fourth day is usually below 5 and may decrease still further on succeeding days. The liquor then has a characteristically unpleasant, acrid odor.

After the fermentation is complete the bacteria and suspended materials are removed either by centrifugation or by treatment with diatomaceous earth followed by filtration. The filtrate is then treated with charcoal, siliceous earth or activated carbon, etc. to adsorb the polymyxin on the material used. The material containing the adsorbed polymyxin is separated by filtration. This solid is thoroughly washed with water and an aqueous alcohol. The active material is then eluted from the solid material by treatment with acidic alcohol. However, if siliceous earth is used as an adsorbing agent it is preferable to elute the active material with a mixture of pyridine in acetic or hydrochloric acids. The active material is then precipitated from the acidic alcohol with a precipitating agent such as acetone or the material may be recovered by concentration of the eluate or by other means. The material is collected, washed and dried. The active material is usually obtained in the form of a salt. The material can be further purified by converting the original salt to the picrate salt as shown in Example III, or it can be dissolved in water at a pH of about 9 and extracted with a water-immiscible alcohol. The alcohol is then treated with dilute acid and after removal of the alcohol the purified product is obtained by vacuum freeze-drying.

Alternatively the polymyxin may be recovered as an aldehyde derivative by precipitation from the alkalinized fermentation liquor by adding an aldehyde such as benzaldehyde, formaldehyde, etc. This aldehyde derivative is treated with acidic methanol, and the salt of polymyxin may be recovered as above. If desired other derivatives may be formed directly from the aldehyde derivative.

Polymyxin may also be recovered directly from the fermentation liquor by alkalizing and extracting with a water-immiscible alcohol such as butanol, 2-ethylhexanol, etc. If sufficient inorganic salt such as sodium chloride is added to the liquor, the extraction may be effected without alkalinization. The solvent is extracted with a dilute mineral acid, and the polymyxin salt obtained by freeze-drying.

The polymyxin can additionally be recovered from the clarified fermentation liquor by a precipitating agent such as tannic acid.

Polymyxin is specifically active against Gram-negative bacteria. It is found to have an antibacterial action on species belonging to the following genera: Aerobacter, Brucella, Eberthella, Escherichia, Hemophilus, Klebsiella, Neisseria, Pasteurella, Proteus, Pseudomonas, Salmonella, Shigella and Vibrio. The in vitro activity of polymyxin is not significantly affected by variations in composition of test medium such as the presence of 10% to 50% blood or changes in pH ranging from pH 5 to 8.

Polymyxin has been found to be highly effective in mice when administered subcutaneously as a single dose immediately after infection with approximately 1000 lethal doses of virulent strains of Pasteurella multocida, or Klebsiella pneumoniae. In experimental infections produced by each of six highly virulent strains of Klebsiella, a single dose of 20 micrograms of polymyxin as the hydrochloride per 20 gram mouse sufficed to protect 90–100% of the animals. Under similar test conditions, a dose of 80 micrograms was similarly effective in experimental infections produced by each of six strains of Pasteurella. A small single dose of polymyxin was highly effective even when treatment was delayed until four hours after infection. When the severity of the Klebsiella infection was increased by inoculation with 100,000 and 10,000,000 lethal doses, the dose of polymyxin required for 90–100% survival rose to 4 and 80 micrograms per mouse, respectively. Doses administered by the subcutaneous and intravenous route were equally effective; when administered orally the dosage had to be increased to obtain 90–100% survival. Doses of 16 milligrams per kilogram of body weight, administered subcutaneously once daily for four days, protected two week old chickens from an otherwise fatal infection produced with a strain of fowl typhoid.

In a study to determine whether resistant organisms can be selected from large populations of cells (10 billion, more or less) of each of twelve normally sensitive strains, representing seven different pathogenic Gram-negative genera, we have thus far failed to obtain any organisms with an appreciable degree of resistance to polymyxin. Under the same conditions, organisms which for all practical purposes are completely resistant to streptomycin can be readily obtained from all of these strains. Streptomycin is the best of the previously known antibiotics for Gram-negative organisms.

Polymyxin is distinguishable from all known antibiotics on the basis of a wide variety of biological and chemical properties. Bacterial strains which were originally sensitive to polymyxin, streptomycin and streptothricin retained their sensitivity to polymyxin after they had been made resistant to streptomycin or streptothricin. The infrared absorption spectra of polymyxin hydrochloride and of polymyxin picrate shown in the composite drawing closely resemble each other. However, the spectra of polymyxin compared with the spectra of other known antibiotics, also shown in the drawing, indicates wide variations, particularly within the frequency range of 700 to 1400 reciprocal centimeters ($cm.^{-1}$).

A unit of polymyxin is defined as the activity of that amount of polymyxin in one ml. of nutrient agar which just prevents the growth of the test organism which is a strain of Escherichia coli designated E. Coli (MacLeod).

Solutions of a crude concentrate of polymyxin (500 units per mg.) were unaffected by prolonged incubation with proteolytic enzymes such as pepsin, trypsin, pancreatin and erepsin. Under similar conditions the antibiotic subtilin is known to be decomposed. Polymyxin has no histamine-like activity when tested on a strip of guinea pig intestine.

Salts of polymyxin with acids such as 2,4,6-trinitro-m-cresol, 2,4,6-trinitro-resorcinol, helianthic acid, and 1-nitro-naphthalene-5-sulfonic acid can be prepared by treating an aqueous solution of the hydrochloride of polymyxin with the appropriate substance. Flavianic acid precipitates the active material from ethanol or water solutions of the hydrochloride. This salt is slightly soluble in hot methanol, ethanol and water and is insoluble in acetone and other organic solvents.

One of the most important derivatives is that obtained by treating an alkaline aqueous solution of polymyxin with formaldehyde and solubilizing this product by treating with sodium bisulfite. This derivative permits the use of relatively large doses of polymyxin parenterally without local irritation. Similar derivatives can be prepared by replacing formaldehyde with other aliphatic and aromatic aldehydes such as acetaldehyde, acrolein, benzaldehyde, salicylaldehyde, p-nitrobenzaldehyde and cinnamic aldehyde. Also, aldehydes of the carbohydrate type such as glucose, galactose and fructose may be used. We can also prepare the sulfoxylates in place of the bisulfites described above.

The acyl derivatives of polymyxin such as acetyl, succinyl, phthalyl, nicotinyl and the like can be prepared by reacting polymyxin with the appropriate anhydride or chloride.

Our invention will now be illustrated in greater particularity by means of the following examples which illustrate the preparation of polymyxin, as well as salts and reaction products thereof. It will be understood that these examples are given for purposes of illustrating certain preferred processes and are not to be construed as limiting the invention to the processes or products described therein. Parts are by weight unless otherwise indicated.

EXAMPLE I

To each of twelve flasks having a capacity of 22 liters is added 7.5 ml. of 10% sodium chloride, 600 ml. of 50% ammonium sulfate, 300 ml. of 10% potassium dihydrogen phosphate, 75 ml. of 10% magnesium sulfate heptahydrate, 15 ml. of 1% ferrous sulfate heptahydrate, 750 ml. of 10% yeast extract and 12,650 ml. of water. The pH is adjusted to 7.9–8.0 (requiring about 23 ml. of saturated sodium hydroxide). After stoppering with cotton wool and gauze, the solution is sterilized by autoclaving for one hour at 15 lb. steam. After cooling to room temperature 600 ml. of 25% dextrose in distilled water (previously sterilized) is added. To the medium is added 15 ml. of a 24 to 48 hour culture of Bacillus polymyxa organism (inoculated from a stock agar slant into 100 ml. of the fermentation medium in a 500 ml. flask and incubated at 25°) and also 15 ml. of a 1% solution of octadecanol in mineral oil (previously sterilized). The final pH of the medium before the start of fermentation is between 7.2 and 7.5.

The flasks are connected with a compressed air line and aeration of the medium is conducted at the rate of 64 liters of sterile air per hour per flask for a period of five days at 25° C. Samples can be taken on the third and fourth day for individual assays and a pooled sample on the fifth day for an average assay.

The metabolic liquor is clarified by centrifuging in a Sharples steam centrifuge and has a potency of about 200 units per ml. A quantity of 33 liters of clarified metabolic liquor is stirred for one hour with 330 g. of activated carbon. The filtered carbon cake is washed with 30 liters of water and then with 50% ethanol until the filtrate is colorless. About 10 liters of alcohol is required. The washed cake is taken up in ten and one-half liters of acid ethanol (4 ml. concentrated hydrochloric acid per liter of 95% ethanol) and stirred over night. Nine and one-half liters of alcoholic eluate is recovered after filtration and concentrated almost to dryness by vacuum distillation. The residue is taken up in about 90 ml. of neutral 95% ethanol and added, with stirring, to approximately 10 volumes of acetone. The acetone precipitate of the active product is essentially colorless. It is collected by centrifugation, washed first with acetone then with ether and dried in vacuo. The yield of polymyxin hydrochloride is 1.65 g., of product, with a potency of 1024 units per mg., representing a recovery of 27.5% of the estimated activity in the metabolic liquor.

On analysis the product was found to contain carbon, hydrogen, oxygen, nitrogen and chlorine. The ninhydrin color test is positive. The biuret test is positive.

EXAMPLE II

The fermentation is carried out for four days at 25° C. as described in Example I. After removal of bacteria and suspended material by treatment with diatomaceous earth and filtration, 180 liters of culture filtrate is treated with 1.7 kg. of siliceous earth and the stirred mixture passed through a filter pre-coated with 1.7 kg. of siliceous earth. The filtrate is then stirred with 684 g. of charcoal in two portions for a period of about 30 minutes each. The charcoal is removed by pressure filtration and the filter cake is then washed to remove inert solids. Washing is carried out with about 150 liters of water followed by 21 gallons of 50% ethanol and then by 5 gallons of absolute methanol. The washed charcoal is eluted with 15 liters of 0.05 N methanolic hydrochloric acid in five portions. Elutions are carried out by stirring one-half hour at 25° C. The active material is precipitated from the alcoholic eluate by addition of 5 to 10 volumes of acetone. The solid is recovered by decantation of the supernatant, centrifugation of the solid material, washing with acetone and ether and finally drying at 25° C. in vacuo. The active material, polymyxin, is obtained in the form of its hydrochloride salt. It is white, water soluble, melting with some darkening at 195°–215° C. and has an activity of about 1400 units per mg.

The polymyxin hydrochloride obtained above has low absorption in the ultraviolet region of the spectrum (2400–4000 Å) with no characteristic maxima or minima (concentration 0.05%). The optical rotation is $[\alpha]_D^{23°} = -40°$ to $-35°$.

When 10 mg. of polymyxin hydrochloride of an activity of 1400–1600 units/mg. is applied to a chromatogram prepared from 4 g. of silica gel containing 6 cc. of a 0.015 molar sulfosuccinate buffer of pH 2 using butanol according to the technique of Martin and Synge (Biochem. J. 35, 1358 (1941)) and the antibacterial activity of the effluent fluid is measured a characteristic distribution of such activity is found.

When 10 mg. of polymyxin hydrochloride of an activity of 1400–1600 units/mg. is applied to a chromatogram prepared from 6 g. of a siliceous earth containing 6 cc. of a 0.015 molar sulfosuccinate buffer at pH 2 using butanol according to the same technique described above and the antibacterial activity of the effluent fluid is measured a characteristic distribution of such activity is also found.

When cyclohexanol rather than butanol is used as the non-aqueous solvent a different but characteristic distribution of activity is found.

If 2-ethylhexanol rather than either of the above solvents is used the anti-bacterial activity is not removed from the column by the passage of 350 cc. of this solvent.

When 10% benzene is added to the butanol in the first example the activity is distributed in the effluent liquid in a different but characteristic manner.

Polymyxin hydrochloride is characterized by the fact that the antibacterial substance may be extracted from aqueous solutions by certain organic solvents under specified conditions. In 30% aqueous salt solutions at a pH of about 2 to about pH 7, the activity is extracted by normal butyl alcohol and the distribution coefficient is about 1. Using the same conditions but with a 10% concentration of sodium chloride the distribution coefficient is greater than 1 while using pure water the coefficient is about 5 to 10. Polymyxin is not extracted by butyl acetate, ethylene chloride or chloroform from 30% aqueous salts solution at pH 7. In aqueous solutions at pH 9, three extractions with equal volumes of normal butyl alcohol remove approximately 90% of the antibacterial activity. This activity may be re-extracted from the butanol into aqueous acid. Under these conditions it is also extracted with cyclohexanol and 2-ethylhexanol but not so completely as with butanol. Polymyxin is completely adsorbed at pH 7 and above, but only slightly adsorbed at pH 1 to 2 by an adsorbing agent such as charcoal.

EXAMPLE III

To 42.6 g. of polymyxin hydrochloride of 1400 units per mg. is added six liters of water and the mixture treated with 15 g. of picric acid which separates a small initial fraction of picrate. The main portion of the activity is then precipitated by treatment with 23 g. of picric acid. The picrate is isolated by cooling and the oily solid dissolved in methanol and reprecipitated with ether to remove excess picric acid. The picrate is then dissolved in methanol and the solution treated with alcoholic hydrochloric acid and the active material precipitated by the addition of 10 volumes of acetone. Solution in methanolic hydrochloric acid and precipitation with acetone is performed twice more and the product obtained is a white hydrochloride salt having an activity of about 1700 units per mg. The filtrate from the second picrate fraction is treated with a further quantity of picric acid (23 g.) in order to obtain a small final fraction of picrate which is combined with the initial fraction for subsequent purification.

The polymyxin hydrochloride obtained above had the following analysis: C 45.8%, H 8.4%, N 14.8%, Cl 9.8%, $NH_2$—N (Van Slyke) =5.7% at 3 minutes and 7.2% at 30 minutes. The ninhydrin test indicated no free carboxyl groups. After acid hydrolysis $NH_2$—N (Van Slyke) =15.7% at 3 and 30 minutes. The Sakaguchi reaction for substituted guanidines is negative. The acidimetric equivalent weight in water (end point at pH 10) was found to be 340 and in the presence of formaldehyde was the same, showing the absence of a free carboxyl group. After acid hydrolysis the acidimetric equivalent weight in water (pH 5.5) was 122. Microbiological assay of the hydrolysate showed the presence of threonine.

The hydrochloride is soluble in water, methanol, ethanol, isopropanol, t-butyl alcohol and wet n-butyl alcohol. It is substantially insoluble in ether, acetone, benzene, chlorinated solvents and dry n-butyl alcohol.

EXAMPLE IV

To each of twelve flasks having a capacity of 22 liters is added 150 grams of soy bean oil meal, 7.5 ml. of 10% sodium chloride, 300 ml. of 10% potassium dihydrogen phosphate, 75 ml. of 10% magnesium sulfate heptahydrate, 15 ml. of 1% ferrous sulfate heptahydrate and 13,400 ml. of water. The pH is adjusted to 7.9–8.0. After stoppering with cotton wool and gauze, the solution is sterilized by autoclaving for one hour at 15 lb. steam. After cooling to room temperature 600 ml. of 25% glucose in distilled water (previously sterilized) is added along with 600 ml. of 25% ammonium sulfate (previously sterilized), and is inoculated with *Bacillus polymyxa*. The final pH of the medium before fermentation is 7.1. After 5 days of fermentation the pH is about 5.5 and the activity 78 units per ml. The fermentation liquor is separated and the polymyxin extracted as in Example II.

EXAMPLE V

Three 500 ml. Erlenmeyer flasks containing 100 ml. of a solution of 1% soluble starch, 2% ammonium sulfate, 0.5% yeast extract, 0.2% potassium dihydrogen phosphate, 0.05% magnesium sulfate, 0.001% ferrous sulfate and 0.005% sodium chloride, sterilized at 15 lb. steam are inoculated with *Bacillus polymyxa*. After stationary fermentation for 4 days at 25° C., the solutions were pooled and assayed 167 units per ml.

In experiments carried out under similar conditions 1% glucose gave 210 units per ml., 1% lactose gave 116 units per ml.

EXAMPLE VI

Three 500 ml. Erlenmeyer flasks containing 100 ml. of a solution of 1% glucose, 2% ammonium sulfate, 2% corn steep liquor, 0.2% potassium dihydrogen phosphate, 0.05% magnesium sulfate, 0.001% ferrous sulfate and 0.005% sodium chloride, was sterilized at 15 lb. steam and inoculated with *Bacillus polymyxa*. After stationary fermentation for 4 days at 25° C. the solutions were pooled and assayed 102 units per ml.

A number of experiments were carried out using the method of the above example. The following results were obtained. 1% dried brewers' yeast gave 43 units per ml., 1% dried distillers solubles gave 50 units per ml., 1% soy bean oil meal gave 132 units per ml., 2% concentrated fish solubles gave 37 units per ml. and 0.5% yeast extract gave 132 units per ml.

EXAMPLE VII

*Polymyxin picrate*

One and one-tenth part of polymyxin hydrochloride of a potency of about 1600 units/mg. is dissolved in 45 parts of 50% aqueous ethanol and the solution is treated with 1.56 parts of picric acid. The mixture is stirred and heated at 50° C. until the picric acid is dissolved and then is refrigerated over night. The solution is decanted from the separated gum and the gum triturated with three 45 cc. portions of ether. After filtration and removal of ether the polymyxin picrate is obtained as a yellow powder. The yield is one and six-tenths part of picrate having a potency of about 900 units/mg.

Polymyxin picrate on combustion is ash free. When examined spectrophotometrically in the ultraviolet region it had 30 to 35% picric acid content. It had an optical rotation of $[\alpha]_D^{24} = -27°$ to $-30°$. The picrate salt is very soluble in acetone and methyl ethyl ketone; soluble in methyl isobutyl ketone, methyl n-amyl ketone, methanol and ethanol; slightly soluble in hot ethyl acetate, butyl acetate and butanol; insoluble in chloroform, petroleum ether and diethylether.

EXAMPLE VIII

*Polymyxin-formaldehyde-sodium bisulfite compound*

Eighteen g. of polymyxin hydrochloride of 1600 u/mg. is dissolved in 85 cc. of water and treated with 52 cc. of 37% formaldehyde solution. An antibacterially active precipitate is brought down by the addition of 2.5 g. of sodium hydroxide in 700 cc. of water. The spongy white solid is filtered with suction and washed with water. The moist solid is then warmed with 5.5 g. of sodium meta-bisulfite and 50 cc. of water. Dilute hydrochloric acid is added to maintain the mixture at about neutrality. The neutral solution resulting from this reaction is vacuum freeze-dried to yield polymyxin - formaldehyde - sodium bisulfite, a white powder having an activity of about 1200 u/mg. This material may also be prepared by reacting formaldehyde sodium sulfonate with the basic polymyxin instead of with polymyxin hydrochloride. The sodium formaldehyde sulfonate derivative is highly water-soluble, insoluble in alcohol, acetone and petroleum ether. The compound is particularly suitable for parenteral injection because of the remarkable freedom from local irritation. It contains the elements C, H, O, N, S, Na. It decomposes at 250–300° C. without melting. Optical activity $[\alpha]_D^{25°}=-30°$ to $-25°$ (C=3.42 in water).

EXAMPLE IX

*Polymyxin-acetaldehyde-sodium bisulfite compound*

A solution of 40 mg. of polymyxin hydrochloride in 2 cc. of 0.1 N sodium hydroxide is warmed with 0.06 cc. of acetaldehyde. The resulting white solid is washed and reacted with sodium bisulfite as in the previous example. The product obtained is polymyxin acetaldehyde sodium bisulfite, a white, water-soluble substance insoluble in organic solvents and decomposing without melting at a high temperature.

EXAMPLE X

*Polymyxin benzaldehyde sodium bisulfite derivative*

Forty mg. of polymyxin hydrochloride is dissolved in 2 cc. of 0.1 N sodium hydroxide and warmed with 0.1 cc. of benzaldehyde. The resulting white solid is washed with water and reacted with 10 mg. of sodium meta-bisulfite by warming. The white water-soluble polymyxin benzaldehyde sodium bisulfite is isolated by vacuum freeze-drying.

EXAMPLE XI

*Polymyxin 4-nitrobenzaldhehyde derivative*

Thirty mg. of polymyxin hydrochloride is dissolved in 2 cc. of 0.1 N sodium hydroxide and warmed with 80 mg. of 4-nitrobenzaldehyde. The pale yellow solid which separated is washed with water and ether. The polymyxin 4-nitrobenzaldehyde derivative is insoluble in water and in organic solvents generally and melts with decomposition above 240°.

EXAMPLE XII

*Polymyxin-4-nitrobenzaldehyde-sodium bisulfite derivative*

Forty mg. of polymyxin hydrochloride is dissolved in 2 cc. of 0.1 N sodium hydroxide and warmed with 80 mg. of 4-nitrobenzaldehyde. The pale yellow solid separating from the reaction mixture is washed with water and warmed with 10 mg. of sodium meta-bisulfite. The polymyxin 4-nitrobenzaldehyde-sodium bisulfite is isolated by vacuum freeze-drying as a pale yellow, water-soluble, high-melting solid.

EXAMPLE XIII

*Acetyl polymyxin*

A basic solution of 20 mg. of polymyxin in water is treated with 0.06 cc. of acetic anhydride. After the rapid reaction, the product is isolated by vacuum freeze-drying. The acetyl polymyxin is a white neutral substance which is soluble in water and insoluble in petroleum ether.

EXAMPLE XIV

*Carbobenzoxy polymyxin*

A solution of 17.5 mg. of polymyxin hydrochloride in 0.6 cc. of water is maintained at pH 8 by the addition of sodium hydroxide solution while being treated portionwise with 10.2 mg. of carbobenzoxy chloride in 0.6 cc. of toluene with stirring. The solid material is collected and washed with water. A yield of 13.5 mg. of carbobenzoxy polymyxin is obtained which decomposes at 228–230° C.

EXAMPLE XV

*Polymyxin sulfate*

A solution of 8 mg. of polymyxin picrate in 2 cc. of ethanol is treated with 0.2 cc. of an alcoholic sulfuric acid solution and poured into a large volume of ether. The precipitate is collected and washed with acetone and ether. The solid polymyxin sulfate shows a biological potency of about 1300 units/mg.

EXAMPLE XVI

*Polymyxin flavianate*

A solution of forty-six mg. of flavianic acid trihydrate in 1 cc. of absolute ethanol is added to a solution of 36 mg. of polymyxin hydrochloride in 3 cc. of absolute ethanol at 60° C. The reaction mixture is cooled and the solid which forms is washed with ethanol. It weighs 48 mg. and has an antibacterial potency of about 900 units/mg. It is soluble in hot methanol and separates from the cooled solution as an oil. It is soluble in hot water and separates as an oil in cooling. It is insoluble in hot acetone.

EXAMPLE XVII

*Polymyxin 2,3,5-triiodobenzoate*

A solution of 19 mg. of polymyxin hydrochloride in 1 cc. of 50% aqueous alcohol is added to a hot solution of 32.2 mg. of sodium 2,3,5-triiodobenzoate in 4 cc. of 50% aqueous alcohol. The solution is evaporated to 3 cc., cooled, and the separated precipitate collected. This is dried and then washed with ether. There is obtained 36 mg. of material of an antibacterial potency of about 400 units/mg. The material is insoluble in ether, dioxane, ethylene chloride, carbon tetrachloride, nitroethane, water, methylethylketone and cold ethyl acetate. It is very soluble in methanol and ethanol.

EXAMPLE XVIII

*Polymyxin salt with 2,4,6-trinitro-m-cresol*

To 0.6 cc. of a saturated solution of 2,4,6-trinitro-m-cresol in 50% aqueous alcohol is added a solution of 2.5 mg. of polymyxin hydrochloride in 0.6 cc. of water. A precipitate forms immediately and redissolves when the mixture is warmed to 50°. On cooling the precipitate the yellow polymyxin salt with 2,4,6-trinitro-m-cresol reappears.

EXAMPLE XIX

*Polymyxin salt with 2,4,6-trinitroresorcinol*

To 0.5 cc. of a saturated solution of 2,4,6-trinitroresorcinol in water is added a solution of 2.5 mg. of polymyxin hydrochloride in 0.6 cc. of water. A cloudiness develops immediately and dissolves on warming. The precipitate of the yellow polymyxin salt of 2,4,6-trinitroresorcinol reappears on cooling.

EXAMPLE XX

*Polymyxin 1-nitronaphthalene-5-sulfonate*

To 0.5 cc. of a dilute solution of 1-nitronaphthalene-5-sulfonic acid in water is added a solution of 2.5 mg. of polymyxin hydrochloride in 0.6 cc. of water. A heavy precipitate forms immediately and is dissolved by the addition of an equal volume of water and warming to 50° C. On slow cooling the polymyxin 1-nitronaphthalene-5-sulfonate separates as a yellow oil.

EXAMPLE XXI

*2,4-dinitrophenyl derivative of polymyxin*

A solution of 17.5 mg. of polymyxin hydrochloride and 17 mg. of sodium bicarbonate in 0.5 cc. of water is treated with 18.6 mg. of 2,4-dinitrofluorobenzene in 0.2 cc. of ethanol by the method outlined by Sanger (Biochem. J. 39, 511 (1945)). The reaction mixture is extracted with ether to remove excess reagent and the insoluble product collected. It is washed with water. The bright yellow 2,4-dinitrophenyl derivative of polymyxin weighs 23.3 mg. The material softens gradually to 235° C. and decomposes from 235 to 250° C. It is insoluble in acetone, chloroform, ethyl acetate, nitromethane and water. It is slightly soluble in glacial acetic acid and very soluble in pyridine.

EXAMPLE XXII

*p-Toluenesulfonyl derivative of polymyxin*

A solution of 17.5 mg. of polymyxin hydrochloride in 0.25 cc. of pyridine is treated with a solution of 47.5 mg. of p-toluenesulfonyl chloride in 0.25 cc. of chloroform and allowed to stand at room temperature for two days. The chloroform is blown off with nitrogen and the pyridine is poured into water. The insoluble material is found to be insoluble in benzene and hexane and soluble in methanol, ethanol, acetone, and chloroform. It is slightly soluble in ethyl acetate and carbon tetrachloride. A yield of 22.6 mg. of the p-toluenesulfonyl derivative of polymyxin is obtained as a slightly colored solid.

EXAMPLE XXIII

A partition chromatographic column is prepared from 36 g. of siliceous earth to which is added 36 cc. of a sulfosuccinate buffer solution at pH 2. One hundred and forty-six mg. of polymyxin hydrochloride having an activity of 1200 units per mg. is dissolved in 1 cc. of a sulfosuccinate buffer solution at pH 2 and mixed with 1 g. of siliceous earth. After this material is placed on the top of the column, butanol which has been equilibrated with sulfosuccinate buffer at pH 2 is passed through the column. Samples of the effluent butanol are collected and assayed for activity. A sharp peak on the effluent-volume versus concentration of activity curve occurs at 400 to 500 cc. of effluent. This peak contains about 70% of the activity used. A subsequent peak at 800 to 1000 cc. of effluent contains about 15% of the activity used. The active materials from each peak are extracted from the butanol effluent with dilute hydrochloric acid and are isolated as white powders by vacuum freeze-drying. This indicates that polymyxin may be a mixture of closely related substances having slightly different distribution coefficients, one of which is predominant. The distribution properties illustrated by these results are reproducible characteristics of the active materials as shown by occurrence of the activity versus effluent peaks at the same characteristic points when the active materials separated in this way are subsequently passed through similar partition chromatographic columns. The same characteristic distribution properties are demonstrated by experiments on a smaller or larger scale when proportionate appropriate changes in quantities are made.

We claim:

A process of producing polymyxin which comprises growing under aerobic conditions an inoculum of the order of 0.1 percent of a 24 to 48 hour culture of *Bacillus polymyxa* in a substantially aqueous medium having a pH between 5 and 8 and containing 0.5% to 2% by weight of a soluble carbohydrate, 1% to 3% by weight of a soluble inorganic ammonium salt, 0.3% to 1% by weight of a proteinaceous substance selected from the group consisting of yeast extract, soy bean meal, and brewer's yeast, 0.1% to 0.5% by weight of potassium dihydrogen phosphate, 0.0001% to 0.005% by weight of magnesium sulfate, a trace of sodium chloride, at a temperature within the range of 20° C. to 30° C. for a period of time of about two days to five days, whereby the aqueous medium is fermented and polymyxin is produced, and recovering the polymyxin from the fermented medium.

PHILIP G. STANSLY.
ROBERT G. SHEPHERD.
ROBERT WINTERBOTTOM.

REFERENCES CITED

The following references are of record in the file of this patent:

FOREIGN PATENTS

| Number | Country | Date |
| --- | --- | --- |
| 315,263 | Great Britain | Aug. 28, 1930 |

OTHER REFERENCES

Tilden et al.: J. Bact., vol. 43, pp. 527–544 (1942).

Bergey's Manual of Determinative Bacteriology (5th edition; Williams and Wilkins Co., Baltimore; 1939) pp. 701–703.

Hotchkiss: J. Biol. Chem., vol. 141, pp. 171–185 (1941).

Katznelson, Canadian Jour. of Research, (1944) pp. 235–240.